US012711529B2

(12) United States Patent
Nada et al.

(10) Patent No.: US 12,711,529 B2
(45) Date of Patent: Aug. 18, 2026

(54) SYSTEM AND METHOD FOR DEEP LEARNING RECOMMENDER

(71) Applicant: ROYAL BANK OF CANADA, Toronto (CA)

(72) Inventors: Omar Nada, Toronto (CA); Hani Almousli, Toronto (CA); Sean Singh, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 321 days.

(21) Appl. No.: 17/086,087

(22) Filed: Oct. 30, 2020

(65) Prior Publication Data

US 2021/0133853 A1 May 6, 2021

Related U.S. Application Data

(60) Provisional application No. 62/928,021, filed on Oct. 30, 2019.

(51) Int. Cl.

| | |
|---|---|
| ***G06Q 30/06*** | (2023.01) |
| ***G06F 17/16*** | (2006.01) |
| ***G06N 3/045*** | (2023.01) |
| ***G06N 3/08*** | (2023.01) |
| ***G06Q 30/0601*** | (2023.01) |

(52) U.S. Cl.

CPC ......... *G06Q 30/0631* (2013.01); *G06F 17/16* (2013.01); *G06N 3/045* (2023.01); *G06N 3/08* (2013.01)

(58) Field of Classification Search

CPC .......................... G06Q 30/06; G06Q 30/0631

See application file for complete search history.

(56) References Cited

U.S. PATENT DOCUMENTS

| | | | | |
|---|---|---|---|---|
| 9,129,227 B1* | 9/2015 | Yee | G06N 3/047 | |
| 2015/0052003 A1* | 2/2015 | Tang | G06Q 30/0631 | 705/26.7 |
| 2018/0342004 A1* | 11/2018 | Yom-Tov | G06N 7/005 | |

OTHER PUBLICATIONS

Nguyen LH, Holmes S. Ten quick tips for effective dimensionality reduction. PLoS Comput Biol. Jun. 20, 2019;15(6):e1006907. doi: 10.1371/journal.pcbi.1006907. PMID: 31220072; PMCID: PMC6586259.*

* cited by examiner

*Primary Examiner* — Jeffrey A. Smith
*Assistant Examiner* — Jennifer V Lee
(74) *Attorney, Agent, or Firm* — Norton Rose Fulbright Canada LLP

(57) ABSTRACT

Recommendations are generated for users by identifying items held by the users defined by a shallow representation and attributes; defining the items based on a deep representation derived from attributes; generating a deep holding matrix identifying the items held by the users based on deep representations; generating a shallow holding matrix identifying the items held by the users based on shallow representations; generating a similarity score matrix between the deep representations; decomposing the shallow holding matrix into a user latent representation and a product feature latent representation; concatenating the product feature latent representation and product information and pass to a first neural network; concatenating the user latent representation and user information and pass to a second neural network; performing a dot product matrix multiplication on the output of the first neural and the output of the second neural network to generate, for every user and every product, a probability.

9 Claims, 10 Drawing Sheets

"shallow products"

102

"deep products"

| PROD_AR_SRVC_ID | ln_desc_grp | CRNCY_CD | INT_TYP | LMT_B | Rate | prod_id |
|---|---|---|---|---|---|---|
| bigint | string | string | double | string | string | bigint |
| integer | Text | Text | Decimal | Text | Text | integer |
| 22 | RBCCL | CAD | 1.0 | (5000.0, 10000.0] | (0.0895, 0.2] | 15 |
| 22 | RBCCL | CAD | 1.0 | (0.009, 5000.0] | (0.0895, 0.2] | 16 |
| 22 | MCCBBU | CAD | 1.0 | (10000.0, 30000.0] | (0.0895, 0.2] | 17 |
| 22 | RBUSGLD | USD | 1.0 | (30000.0, 858757420.0] | (0.0895, 0.2] | 18 |
| 22 | MCCBBU | CAD | 1.0 | (5000.0, 10000.0] | (0.0895, 0.2] | 19 |
| 22 | MCCBBU | CAD | 1.0 | (30000.0, 858757420.0] | (0.0895, 0.2] | 20 |
| 22 | RBAIBX | CAD | 1.0 | (30000.0, 858757420.0] | (0.0895, 0.2] | 21 |
| 22 | RBAIBX | CAD | 1.0 | (0.009, 5000.0] | (0.0895, 0.2] | 22 |
| 22 | RBAIBX | CAD | 1.0 | (5000.0, 10000.0] | (0.0895, 0.2] | 23 |
| 20 | DEMAND | CAD | 2.0 | (30000.0, 858757420.0] | (0.0525, 0.0895] | 24 |
| 20 | US-DMD | USD | 2.0 | (30000.0, 858757420.0] | (-0.011, 0.0525] | 25 |
| 20 | RCL | CAD | 2.0 | (10000.0, 30000.0] | (0.0525, 0.0895] | 26 |
| 21 | COMM | CAD | 1.0 | (30000.0, 858757420.0] | (0.0525, 0.0895] | 27 |
| 20 | DEMAND | CAD | 2.0 | (0.009, 5000.0] | (0.0525, 0.0895] | 28 |
| 20 | DEMAND | CAD | 2.0 | (10000.0, 30000.0] | (-0.011, 0.0525] | 29 |
| 20 | DEMAND | CAD | 2.0 | (0.009, 5000.0] | (-0.011, 0.0525] | 30 |
| 20 | DEMAND | CAD | 2.0 | (30000.0, 858757420.0] | (-0.011, 0.0525] | 31 |
| 20 | G/GUAR | CAD | 2.0 | (30000.0, 858757420.0] | (0.0525, 0.0895] | 32 |

FIG. 2A

| uid | pid | score |
|---|---|---|
| 183660 | 24 | 1 |
| 107402 | 24 | 1 |
| 113339 | 24 | 1 |
| 265179 | 24 | 1 |
| 519083 | 24 | 1 |
| 198207 | 24 | 1 |
| 248940 | 24 | 1 |
| 336019 | 24 | 1 |
| 448631 | 24 | 1 |
| 131418 | 24 | 1 |
| 75743 | 24 | 1 |
| 192683 | 24 | 1 |

| 1 | 2 | 3 | 4 | 5 | 6 | 7 | 8 | 9 | 10 | 11 | 12 | 13 | 14 |
|---|---|---|---|---|---|---|---|---|---|---|---|---|---|
| 1 | 0 | 0 | 0 | 0.92307692 | 0.76923077 | 0 | 0 | 0 | 0 | 0 | 0 | 0.84615385 | 0 |
| 0 | 1 | 0.76923077 | 0.84615385 | 0 | 0 | 0.92307692 | 0 | 0 | 0 | 0 | 0 | 0 | 0 |
| 0 | 0.76923077 | 1 | 0.92307692 | 0 | 0 | 0.84615385 | 0 | 0 | 0 | 0 | 0 | 0 | 0 |
| 0 | 0.84615385 | 0.92307692 | 1 | 0 | 0 | 0.92307692 | 0 | 0 | 0 | 0 | 0 | 0 | 0 |
| 0.92307692 | 0 | 0 | 0 | 1 | 0.84615385 | 0 | 0 | 0 | 0 | 0 | 0 | 0.92307692 | 0 |
| 0.76923077 | 0 | 0 | 0 | 0.84615385 | 1 | 0 | 0 | 0 | 0 | 0 | 0 | 0.92307692 | 0 |
| 0 | 0.92307692 | 0.84615385 | 0.92307692 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 1 | 0 | 0 | 0.92307692 | 0 | 0.76923077 |
| 0 | 0 | 0 | 0 | 0 | 0 | 0 | 0 | 0 | 1 | 0.92307692 | 0 | 0 | 0 |
| 0 | 0 | 0 | 0 | 0 | 0 | 0 | 0 | 0 | 0.92307692 | 1 | 0 | 0 | 0 |
| 0 | 0 | 0 | 0 | 0 | 0 | 0 | 0 | 0.92307692 | 0 | 0 | 1 | 0 | 0.84615385 |
| 0.84615385 | 0 | 0 | 0 | 0.92307692 | 0.92307692 | 0 | 0 | 0 | 0 | 0 | 0 | 1 | 0 |

FIG. 2C

| 39 | 106 | 71 | 86 | 212 | 55 | 104 | 103 | 60 | 76 | 31 | uid |
|---|---|---|---|---|---|---|---|---|---|---|---|
| 0.99875116 | 0.00556106 | 0.98123276 | 0.0019004 | 0.02168971 | 0.9965702 | 0.01016913 | 0.3650747 | 0.9962743 | 0.94638634 | 0.9814651 | 183660 |
| 0.9979936 | 0.0063809 | 0.9857917 | 0.00258902 | 0.02954908 | 0.9951035 | 0.01385396 | 0.4086886 | 0.9958329 | 0.9539523 | 0.9790215 | 113339 |
| 0.99899614 | 0.00571469 | 0.98283935 | 0.00199424 | 0.02276066 | 0.99610054 | 0.01067124 | 0.37393567 | 0.9966383 | 0.94887966 | 0.9803157 | 265179 |
| 0.9370737 | 0.00656509 | 0.9062003 | 0.00348417 | 0.03976559 | 0.96420115 | 0.01864393 | 0.40297824 | 0.92688817 | 0.8640823 | 0.98722476 | 519083 |
| 0.9504478 | 0.00432967 | 0.90833527 | 0.00173052 | 0.01975083 | 0.9765755 | 0.0092601 | 0.28180304 | 0.94141686 | 0.85632336 | 0.9956863 | 198207 |
| 0.87976944 | 0.00342143 | 0.8243736 | 0.00159236 | 0.01817391 | 0.92295396 | 0.00852076 | 0.2202304 | 0.8669843 | 0.76117164 | 0.9624599 | 248940 |
| 0.90519756 | 0.00325155 | 0.8523601 | 0.0012912 | 0.01473672 | 0.9430175 | 0.00690925 | 0.21469803 | 0.8941937 | 0.78943413 | 0.97454524 | 336019 |
| 0.9164096 | 0.00382823 | 0.86875206 | 0.00161733 | 0.01845897 | 0.95235187 | 0.00865441 | 0.24862465 | 0.90597844 | 0.8097287 | 0.9811146 | 448631 |
| 0.9910406 | 0.00579592 | 0.97033393 | 0.00223826 | 0.02554574 | 0.9986688 | 0.01197701 | 0.3744343 | 0.98673815 | 0.9339048 | 0.9939375 | 131418 |
| 0.9498134 | 0.00414553 | 0.90699583 | 0.00157405 | 0.01796499 | 0.97615993 | 0.00842281 | 0.2720599 | 0.94088495 | 0.85433227 | 0.9952137 | 75743 |
| 0.9952278 | 0.00504919 | 0.97353905 | 0.00157597 | 0.01798688 | 0.9985591 | 0.00843308 | 0.3355543 | 0.99238664 | 0.93638504 | 0.9882825 | 282809 |
| 0.9438822 | 0.00457331 | 0.9017484 | 0.00199498 | 0.0227692 | 0.97187173 | 0.01067525 | 0.29350203 | 0.9342601 | 0.8496848 | 0.99393535 | 268017 |
| 0.9885497 | 0.00685334 | 0.974614 | 0.0031195 | 0.03560349 | 0.99504185 | 0.01669255 | 0.43091524 | 0.9844083 | 0.94282895 | 0.9894839 | 408194 |
| 0.98966503 | 0.00683549 | 0.9769061 | 0.00312036 | 0.03561338 | 0.99525464 | 0.01669719 | 0.4295592 | 0.9862734 | 0.9462903 | 0.98832625 | 221009 |
| 0.926354 | 0.004341 | 0.8824505 | 0.00196846 | 0.02246648 | 0.95993304 | 0.01053331 | 0.27763247 | 0.91632575 | 0.8263513 | 0.98609775 | 16058 |
| 0.9932076 | 0.00708197 | 0.9836859 | 0.00327569 | 0.0373862 | 0.99396473 | 0.01752837 | 0.44393688 | 0.9905773 | 0.95528716 | 0.981238 | 224366 |
| 0.87552375 | 0.00275697 | 0.81654465 | 0.00111689 | 0.01274731 | 0.919164 | 0.00597652 | 0.18326625 | 0.8629664 | 0.7502533 | 0.9585692 | 455213 |
| 0.9880421 | 0.00613114 | 0.96851116 | 0.00254202 | 0.02901263 | 0.99726814 | 0.01360245 | 0.3917939 | 0.98333234 | 0.9331003 | 0.9944994 | 237325 |
| 0.9887767 | 0.00572552 | 0.96682614 | 0.00220151 | 0.02512636 | 0.99806184 | 0.01178039 | 0.37018642 | 0.98406315 | 0.92960644 | 0.99558187 | 497912 |
| 0.9940156 | 0.00525293 | 0.97250485 | 0.00180137 | 0.02055947 | 0.9991238 | 0.00963922 | 0.3453556 | 0.9908439 | 0.93525136 | 0.9908174 | 431152 |
| 0.9938221 | 0.00535068 | 0.97290343 | 0.00185328 | 0.02115189 | 0.9992416 | 0.00991697 | 0.35112178 | 0.99052215 | 0.9359252 | 0.99118906 | 380345 |

FIG. 2E

SYSTEM AND METHOD FOR DEEP LEARNING RECOMMENDER

CROSS-REFERENCE TO RELATED APPLICATION(S)

This application claims priority from U.S. Provisional Patent Application No. 62/928,021 filed on Oct. 30, 2019, the entire contents of which are hereby incorporated by reference herein.

FIELD

This disclosure relates to recommender systems, in particular, the application of deep learning techniques to generate recommendations.

BACKGROUND

Traditional recommender systems utilize information filtering to present information, such as a recommended product or service, that is likely to be of interest to a user. However, it can be challenging to generate useful recommendations in domains that have few products and services from which a recommendation can be drawn.

SUMMARY

According to an aspect, there is provided a computer-implemented method for generating recommendations for users, comprising: identifying items held by the users, each of the items defined by a shallow representation and one or more attributes; defining the items held by the users based on a deep representation, the deep representation derived from attributes of the items; generating a deep holding matrix identifying the items held by the users based on the deep representation of the items; generating a shallow holding matrix identifying the items held by the users based on the shallow representation of the items; generating a similarity score matrix of scores between the deep representations based on a similarity between attributes or derived attributes; decomposing, by way of matrix factorization, the shallow holding matrix into a user latent representation and a product feature latent representation, based at least in part on the similarity score matrix; concatenating the product feature latent representation and product information to be passed to a first neural network to generate a first output; concatenating the user latent representation and user information to be passed to a second neural network to generate a second output; and performing a dot product matrix multiplication on the first output and the second output to generate, for every user and every product, a probability for a recommendation.

According to another aspect, there is provided a computer system comprising: a processor; a memory in communication with the processor, the memory storing instructions that, when executed by the processor cause the processor to perform a method as disclosed herein.

According to a further aspect, there is provided a non-transitory computer-readable medium having computer executable instructions stored thereon for execution by one or more computing devices, that when executed perform a method as disclosed herein.

According to yet another aspect, there is provided a computer-implemented method for generating a product recommendation for a user, comprising: particularize information about a plurality of products based on attributes of the products, one of the attributes being family; generate a holding matrix to identify user holdings of the products; calculate a similarity score matrix between the products based on common attributes between the products; generate a latent representation of the families of the products based on the holding matrix and the similarity score matrix; generate a latent representation of the user holdings of the products based on the holding matrix and the similarity score matrix; and using a neural network with input from information associated with each user, the product attributes, the latent representation of the families, and the latent representation of then users, generate the product recommendation for the user.

Other features will become apparent from the drawings in conjunction with the following description.

BRIEF DESCRIPTION OF DRAWINGS

In the figures which illustrate example embodiments,

FIG. 2A is a deep products table, according to an embodiment;

FIG. 2C illustrates an example of deep product similarity score, according to an embodiment;

FIG. 2E illustrates an example of the final output, according to an embodiment;

DETAILED DESCRIPTION

In embodiments disclosed herein, using deep learning techniques, a recommender system identifies potential products and/or services for a particular user or client. References to "products" and "services" as used herein will be understood to refer products and/or services, and apply interchangeably. "Products" and "services" may also be interchangeably referred to herein as "items". Systems and methods disclosed herein may identify a client's information including their profile, size, age as well as financial health. Product profiling can also be performed. The recommender system can thus take into consideration the nature of products, user profile, and how other users have succeeded with their products to generate a recommendation to match a specific product to a client.

Embodiments of a recommender system disclosed herein may allow for recommendations to be made in domains, such as banking, that have fewer products and services available in certain domains.

Furthermore, embodiments of a recommender system disclosed herein may provide recommendations that account for more granular attributes of a product and/or service that is being recommended.

Figure 1A:
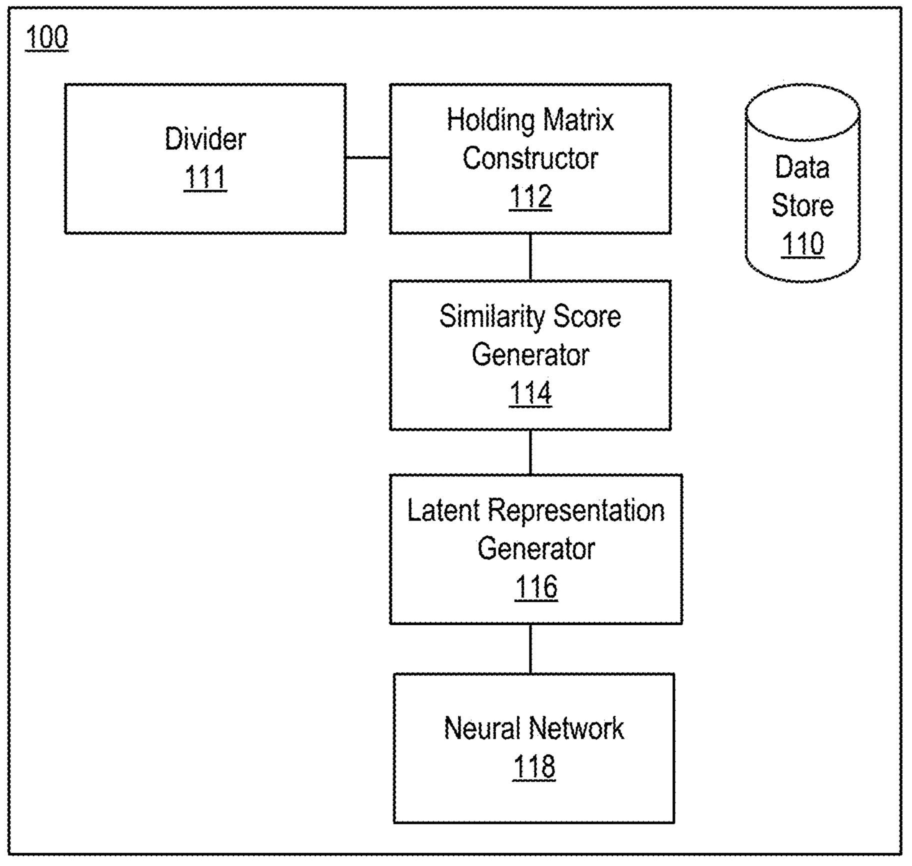
FIG. 1A is a schematic diagram of a recommender system, according to an embodiment.
Figure 1B:
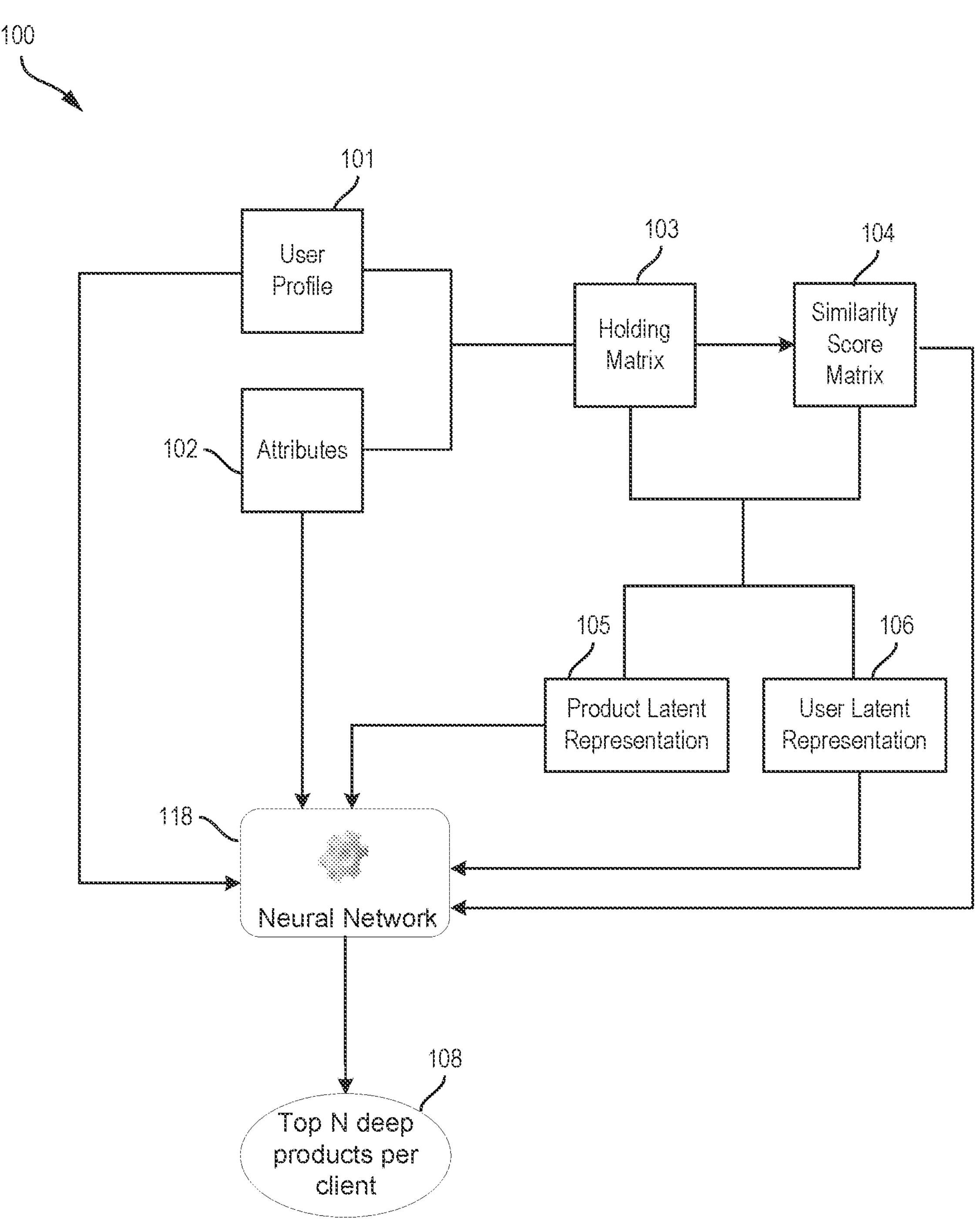
FIG. 1B is a data flow diagram of the recommender system of FIG. 1A, according to an embodiment.

FIG. 1A illustrates a recommender system 100, in an embodiment. FIG. 1B illustrates an example data flow of recommender system 100, in an embodiment.

Recommender system 100 includes a divider 111, a holding matrix constructor 112, a similarity score generator 114, a latent representation generator 116, a neural network 118, and a data store 110, as described in further detail below.

Data store 110 can be configured to store data used and generated by recommender system 100 such as a user profile 101, attributes 102, a holding matrix 103, a similarity score matrix 104, a product latent representation 105, a user latent representation 106, and a dataframe 108.

Products or services may be characterized by "shallow" products/services or "families". In the banking industry, by way of example, various types of financial products such as mortgages, loans or lending, credit cards, and overdrafts, would all be examples of shallow products or families of products. A "shallow product" or "shallow representation" can be considered as a shallow categorization or representation of a product.

Divider 111 may be configured to divide shallow products/services into multiple "deep" products or services based on further particularized attributes 102 of the products or services. Thus, divider 111 may be used to further particularize a product/service into more detailed granularity, namely, "deep products", based on and identified by specific attributes of that product/service. A "deep product" or "deep representation" can be considered a derived attribute of a product, and derived from attributes 102 of a product. It should be understood that a particular product and/or service can be defined both by its "shallow product" (e.g., loan) and/or as a "deep product" based on derived attributes (e.g., loan with a principal in a range of <$1000).

Division from shallow to deep products/services can be based in part on domain and business knowledge, for example, to identify the number of attributes 102 and characteristics of those attributes 102 to divide shallow products/services into.

Such division may be performed to differentiate products or services based on attributes 102 that are statistically significant, such as an interest rate in the context of a credit card.

In some embodiments, attributes 102 include information related to deep product/service info, and the nature of such products or services.

In an example, a mortgage may be divided into separate products, each "deep product" thus differentiated by attributes 102 such as amount, amortization period, interest rate, and type of interest rate.

In some embodiments, distributions of attributes 102 are determined using a suitable statistical technique such as quantile bucketing. To perform quantile bucketing, users holding a shallow product are sorted, for example, in an ascending or descending order based on values of a particular attribute of the shallow product (in an example, the shallow product is a loan and the attribute is the loan amount). The users are then distributed into a number of bins or buckets, such that each bucket contains the same (or almost the same) number of users. In order for each bucket to contain the same number of users, some buckets may cover a different span of values of the attribute (for example, a range of values for the loan amount).

The number of users that own a shallow product may be statistically divided into equal buckets, where each bucket will have almost similar number of users. The result is multiple buckets with different value ranges for the attribute.

Following a quantile bucketing procedure, the resulting attribute value ranges of each bucket can define a derived attribute, which can be used to form a "deep product" representation of a product.

In an example, a shallow product can be a loan, and a population of a hundred users who each hold a loan. The users can be sorted in ascending order of an attribute such as loan amount. The sorted users can be divided into five buckets, such that each bucket contains twenty users, and each bucket spans the range of loan amount values of the users in that bucket, such as <$10,000, $10,000-$25,000, and the like.

Such divisions may allow for an increase in the scope of number of products or services.

FIG. 2A is an example of a table of values of attributes 102 in the form of a deep products table. FIG. 2A is a representation of how products can be divided into a "deeper" version (more granular) using features such as those shown (e.g., currency, interest type, limit and rate). Each row in FIG. 2A represents a deep product. The "In_desc_grp" column lists "shallow products", or a shallow representation of a product, such as "RBCCL" in an example. The first two rows of FIG. 2A illustrate shallow product RBCCL with different features where the LMT_B (the principal amount) is different (one between 0.09-5000 and 5000-1000. LMT_B is an example of a derived attribute, based on the attribute 102 of each product. For example, the first row has a principal amount in the range of (5001-10000.0], where a square bracket can indicate that the end of range is inclusive, and a rounded parenthesis can indicate that the end of the range is exclusive. The column "Rate" indicates a derived attribute of the range of interest values that the interest rate for that particular deep product is in.

Recommender system 100 also includes holding matrix constructor 112, which is configured to generate a holding matrix 103 listing each user's product holdings, based in part on their user profile 101. Each user is associated with a user profile 101, containing data such as client information, associated with users.

In some embodiments, holding matrix constructor 112 generates a holding matrix for shallow products, containing information relating to which user's hold which shallow products.

In some embodiments, holding matrix constructor 112 generates a holding matrix for deep products, containing information relating to which user's hold which deep products. A shallow holding matrix can be used for generating a latent representation, as described further below. A deep holding matrix can be used to make a model learn that a specific user likes a very specific product (deep product).

Figure 2B:
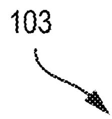
FIG. 2B illustrates an example of a deep holding matrix, according to an embodiment.

FIG. 2B illustrates an example of a deep holding matrix, in an embodiment.

A similarity score generator 114 is configured to calculate a similarity score matrix 104 containing similarity scores between deep products. For example, similarity score generator 114 can determine a percentage similarity between each deep product (based on attributes 102) using each deep product's attributes. In some embodiments, a similarity score may be calculated using domain knowledge provided by business partners, such as Business Financial Services (BFS).

In some embodiments, a similarity score between two deep products may be determined using a distance similarity scoring system, such as based on a binary distance measure between attributes.

In some embodiments, any deep product from different shallow product will have similarity scores of zero (indicating that there is not any similarity).

For deep products that are part of the same shallow product, a similarity score may be calculated based on how many attributes or features the deep products have in common, and defined as the proportion of attributes or derived attributes that the deep products share that have the same or similar values (within a threshold). In an example, if two deep products have seven attributes each, and one attribute value is different between two deep products, the similarity score can be: 6/7=85.7%, resulting in a similarity score of 85.7%. In an example of deep products with differences between two attribute values, the similarity score can be defined as 5/7=71.4%. In a further example, if two out of five attribute values are similar, two deep products may have a similarity score of 2/5=40%.

In some embodiments, other suitable similarity scoring functions can be used, including more complex similarity scoring such as cosine similarity based on attribute values between deep products.

In some embodiments, a similarity score may take into consideration, for different attribute values between deep products, the value or quantity of the difference between the attribute values, in combination or in place of how many attributes are different.

Similarity may be calculated between any product and all other products.

In some embodiments, a deep product compared to another deep product from a different family would have zero similarity, for example a credit card and a mortgage.

FIG. 2C illustrates an example of deep product similarity score, according to an embodiment.

In some embodiments, latent representation generator 116 is configured to map "deep product" data of attributes 102 to a latent space of "shallow products", generating a product latent feature representation 105 such that "deep products" belonging to similar "shallow products" are closer in the latent space, or a shallow product representation. Product latent feature representation 105 is thus a latent representation for a shallow product or family of products.

In some embodiments, product latent feature representation 105 is generated based on holding matrix 103 and similarity score matrix 104. In an example, dimensionality of "deep product" information may be reduced from one-hot encoding.

In some embodiments, product latent feature representation 105 is generated by applying an embedding model such as matrix factorization on holding matrix 103, such as holding matrix 103 for shallow products. A shallow product holding matrix can be used for the latent representation and a deep product holding matrix can be used for inputs to the deep learning model (such as neural network 118). Product latent feature representation 105 provides a compressed numeric representation of a product/service given users' holdings.

Applying matrix factorization can involve decomposing holding matrix 103 into the product of two lower dimensionality rectangular matrices—namely, product latent feature representation 105 and user latent representation 106.

In some embodiments, matrix factorization is a method to be able to predict every unknown entry in the given matrix. Original matrix will have very few known items and a lot of unknown items. The first step of matrix factorization is to break the original (holding) matrix into two much smaller matrices that when they are multiplied they fill every single entry (unknowns) in the original matrix.

Thus, latent representation generator 116 may be configured to fixate the latent feature representation of each of the divided deep products to the feature representation of the family (shallow product) of that product itself. This may ensure that a user with the same shallow product (e.g., mortgage) will have similar representations in latent space even if there product attribute values are different (e.g., 5-year mortgage as compared to 3-year mortgage).

Conveniently, dividing the products (to "deep products") and then fixating their latent representations may allow for more granular products yet similar representation.

In some embodiments, users with similar product holdings will be given closer scores and it can be viewed as a closer distance in a given multi-dimensional space. Similarly, products that co-exist together will often have similar holdings. For example, if product A and B exist together a lot in the users, then they will have similar embeddings.

In some embodiments, latent representation generator 116 is also configured to generate a user latent representation 106 or client representation.

For example, deep products may be grouped close to each other in latent space if users tend to hold those types of products together.

In some embodiments, user latent representation 106 is generated based on holding matrix 103 and similarity score matrix 104.

In some embodiments, user latent representation 106 is generated by applying an embedding model such as matrix factorization on holding matrix 103, such as holding matrix 103 for shallow products.

Conveniently, generating a user latent representation 106 may identify similarities between users. For example, users with similar shallow product holdings will be given closer scores, which can represent a closer distance in a multi-dimensional space. If users are grouped together, this means that when that representation is given to the model the difference between the two users are not too different.

In some embodiments, recommender system 100 uses latent features/representations (such as for the product family itself instead of the divided deep products) as input to neural network 118 to generate a recommendation. This can allow for similarities to be identified between products (e.g., product latent feature representation 105) and users (e.g., user latent representation 106) with similar deep products.

The architecture of neural network 118 can include a suitable number of networks or layers.

In some embodiments, neural network 118 includes three connected networks or layers, in an embodiment, a first dense layer, a second dense layer and a third dense layer.

A first network or dense layer processes products/services by concatenating product/service features and embeddings.

A second network or dense layer processes the clients by concatenating user features and embeddings.

In some embodiments, the first network and the first network have identical structures.

A third network or dense layer processes the output of the first and second network.

In some embodiments, hyperparameters of neural network 118 can be determined from testing using grid search where almost every combination was determined. Hyperparameters can include, for example, dropout rate, number of neurons in each layer, number of layers, batch_size, number of epochs, and the like. A grid search can involve trying almost every possible value/combination of the values of the hyperparameter to be able to find the one with the highest score.

In some embodiments, one or more of user profile 101, user latent representation 106, product attributes 102, product latent feature/representation 105, are input to neural network 118.

In some embodiments, there are three networks. One network takes the user information and user embeddings, another takes the items (products/services) information and item embeddings. The output of each of these networks are then fed to the third network that outputs a single score.

The first network of neural network 118 may take user profile 101, user latent representation 106 as input. In some embodiments, the activation function used in the first network is relu ("Recitified Linear Unit") where the output is a 64-dimensional vector consisting of numbers that represents the users with all its information and latent representation.

The second network of neural network 118 may take product attributes 102 and product latent feature/representation 105 as input. In some embodiments, the activation function used in the first network is ReLU ("Rectified Linear Unit") where the output is a 64-dimensional vector consisting of numbers that represents the deep product with all its information and latent representation.

The third network of neural network 118 may take the output of the first network and the second network as input to output a probability of a client holding that deep product. In some embodiments, the activation function is a sigmoid function resulting in a single number that is between 0 and 1 representing a matching score or probability of a given user and a specific deep product. In some embodiments, the output is probability/matching score for every user with every deep product. The score will be the probability that a user will like a product/service.

Neural network 118 can be trained using a suitable training technique.

Following training, a traditional neural network prediction or inference function can take minutes to execute, affecting performance. In some embodiments, output trained embeddings are obtained from the output of the first (user) neural network and the second (product) neural network. and instead of being passed to the third neural network, a dot product operation is performed, performing matrix multiplication between the output of the first and the second neural network, generating every combination between users and products/services in a matter of seconds.

A trained model prediction can be served or provided, for example, to a user, by looking up the user-item score. The user-item score can indicate a probability that a user will like a product/service. All the predictions can be saved and given to the user.

Figure 2D:
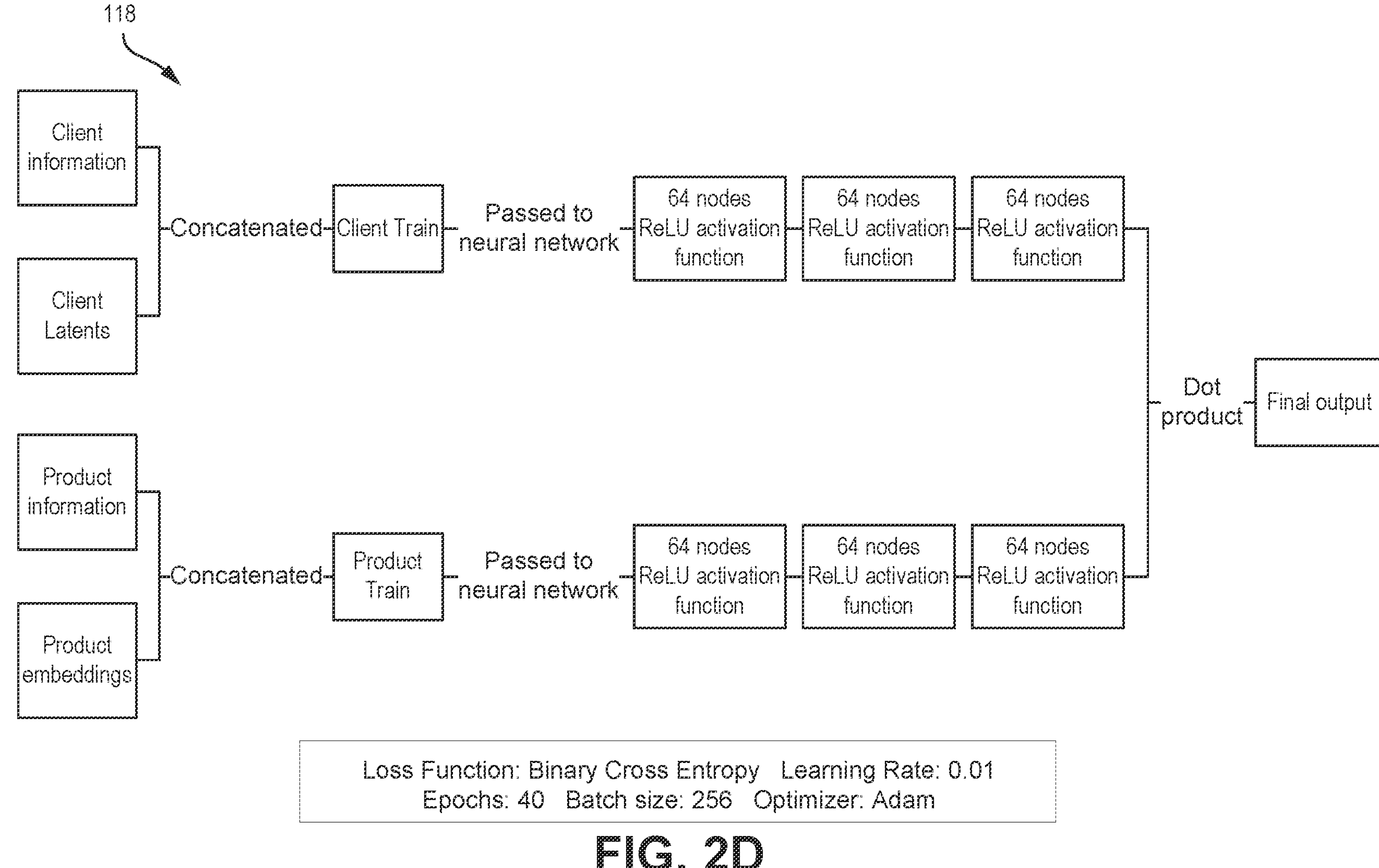
FIG. 2D illustrates an architecture for a neural network, according to an embodiment.

FIG. 2D illustrates an architecture for neural network 118, in an embodiment. Product information and product embeddings are concatenated to form a product train that is passed to the first network. The first network may have three layers, of 64 nodes using ReLU activation functions. Client information and client latents are concatenated to form a client train that is passed to the second network. The second network may have three layers, of 64 nodes using ReLU activation functions. A dot product operation is performed on the output of the first network and the second network, generating the final output.

FIG. 2E illustrates an example of the final output, in an embodiment.

As illustrated in FIG. 1B, an output of the model will be for each given client/user, a top-n recommendation of deep products where n is a pre-defined number, for example, chosen by the business, along with the probability of the likelihood that the given user will like the recommended product.

Thus, a dataframe 108 can be constructed for each user with n number of products that are similar to a user's existing holdings. The score for each product, for example, between 0-100, is the maximum score between a randomly chosen product and the product held by the user. Similarities of zero may be omitted from dataframe 108.

In some embodiments, recommender system 100 does not find the closest product or service for a user. Instead, n number of products are chosen using a random sampling technique. In an example, this can be negative sampling. Random products that do not belong to the users are chosen from all the products that are not owned by the user to be fed to the model. Conveniently, this may save a lot of time and computation power.

In some embodiments, a probability of client holding is represented by deep product similarity score.

Figure 3A:
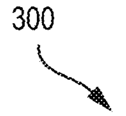
FIG. 3A is a flow chart of a method for deep learning recommending, according to an embodiment.
Figure 3A:
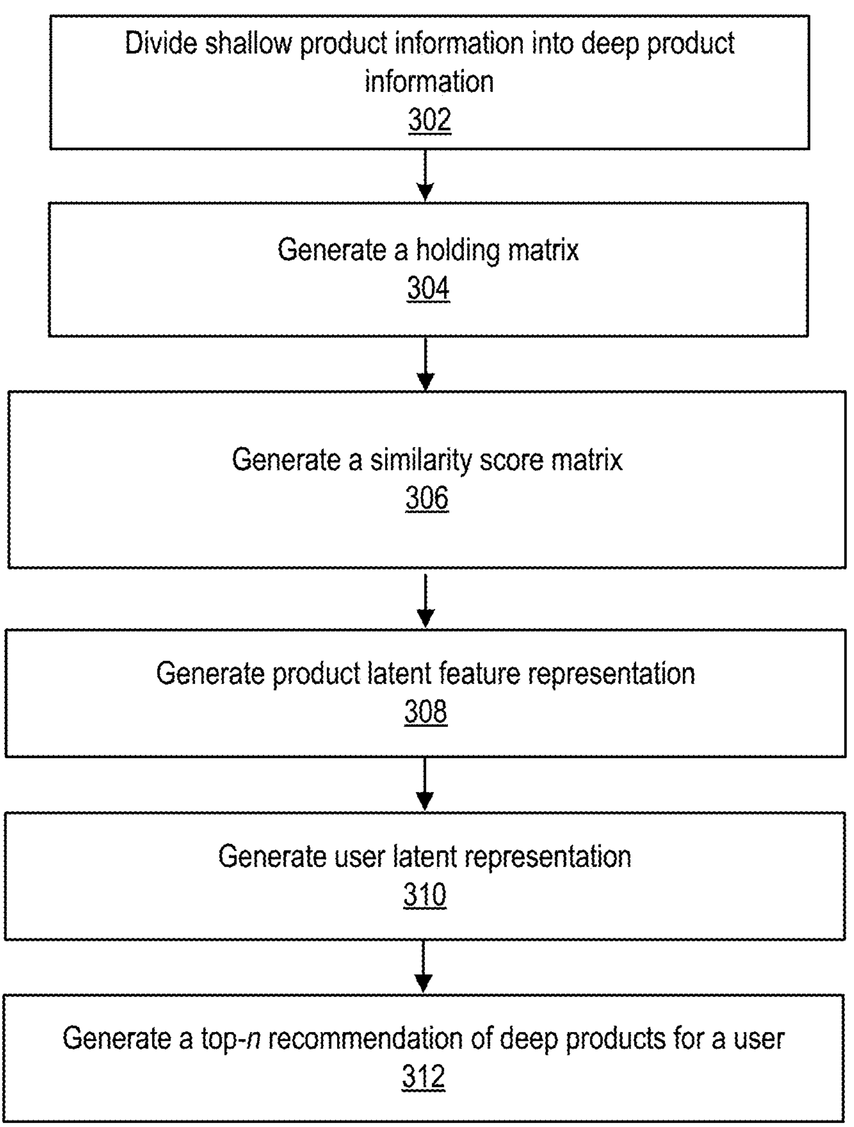

FIG. 3A illustrates a flow chart of a method 300 for deep learning based recommendation, according to an embodiment. The steps are provided for illustrative purposes. Variations of the steps, omission or substitution of various steps, or additional steps may be considered.

At block 302, for shallow product or service data, divider 111 divides shallow product information to deep product information, stored as attributes 102.

At block 304, holding matrix constructor 112 generates holding matrix 103, identifying which users hold which products.

At block 306, similarity score generator 114 generates a similarity score matrix 104 with the percentage similarity between each deep product (based on attributes 102) using each product's attributes.

At block 308, latent representation generator 116 generates product latent feature/representation 105 based on holding matrix 103 and similarity score matrix 104, a latent representation for the shallow product/family of products.

At block 310, latent representation generator 116 generates user latent representation 106 is generated based on holding matrix 103 and similarity score matrix 104 to identify similarities between users.

At block 312, neural network 118 takes user profile 101, user latent representation 106, product attributes 102, product latent feature/representation 105 to generate a top-n recommendation of deep products for a user.

It should be understood that one or more of the blocks may be performed in a different sequence or in an interleaved or iterative manner.

Figure 3B:
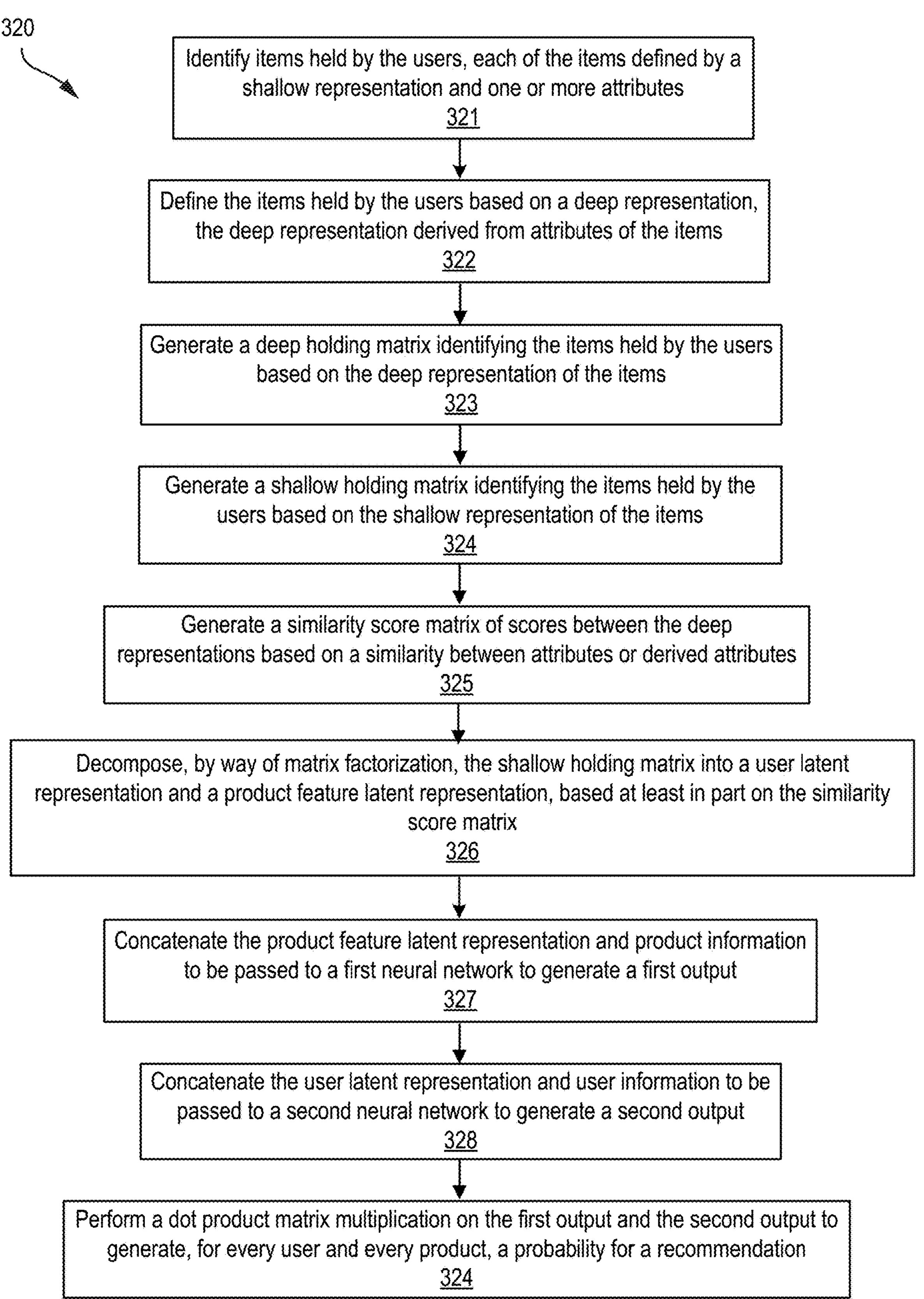
FIG. 3B is a flow chart of a method for generating recommendations, according to an embodiment.

FIG. 3B illustrates a flow chart of a method 320 for deep learning based recommendation, according to an embodiment. The steps are provided for illustrative purposes. Variations of the steps, omission or substitution of various steps, or additional steps may be considered.

At block 321, items held by the users are identified, each of the items defined by a shallow representation and one or more attributes.

At block 322, the items held by the users are defined based on a deep representation, the deep representation derived from attributes of the items.

At block 323, a deep holding matrix is generated, identifying the items held by the users based on the deep representation of the items.

At block 324, a shallow holding matrix is generated, identifying the items held by the users based on the shallow representation of the items.

At block 325, a similarity score matrix of scores is generated between the deep representations based on a similarity between attributes or derived attributes.

At block 326, the shallow holding matrix is decomposed, by way of matrix factorization, into a user latent representation and a product feature latent representation, based at least in part on the similarity score matrix.

At block 327, the product feature latent representation and product information are concatenated and passed to a first neural network to generate a first output.

At block 328, the user latent representation and user information are concatenated and passed to a second neural network to generate a second output.

At block 329, a dot product matrix multiplication is performed on the first output and the second output to generate, for every user and every product, a probability for a recommendation.

It should be understood that one or more of the blocks may be performed in a different sequence or in an interleaved or iterative manner.

Figure 4:
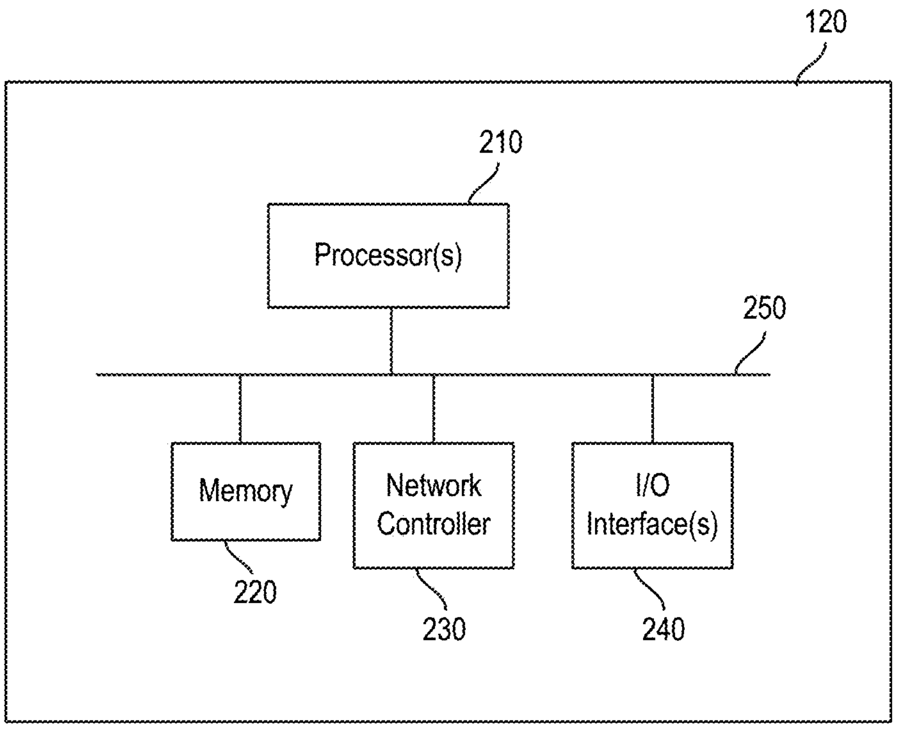
FIG. 4 is a block diagram of example hardware components of a computing device for deep learning recommending, according to an embodiment.

Recommender system 100, in particular, one or more of divider 111, holding matrix constructor 112, similarity score generator 114, latent representation generator 116, neural network 118, and data store 110, may be implemented as software and/or hardware, for example, in a computing device 120 as illustrated in FIG. 4. Method 300, in particular, one or more of blocks 302 to 312, and method 320, in particular, one or more of blocks 321 to 329, may be performed by software and/or hardware of a computing device such as computing device 120.

As illustrated, computing device 120 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 120. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Example software components and data stored within memory 220 of computing device 120 may include software to generating a deep learning based recommendation, as described herein, and operating system (OS) software allowing for basic communication and application operations related to computing device 120.

Embodiments as disclosed herein may advantageously improve accuracy in identifying potential needs for clients. For example, accuracy can be measured using AUC (Area Under the Curve), RMSE (Root Mean Squared Error). Earlier models' AUC was averaged to be 82.7% and with the deep learning model score AUC of more than 96% which means that the model has improved a lot over earlier techniques in identifying potential needs for clients.

Conveniently, embodiments as disclosed herein may provide detailed information of a product (deep product), can save three to four days of paper work by the account manager, and improve accuracy of product predictions by at least 13%.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for processing data having varying levels of granularity, the method comprising:

from a data store of items including a plurality of item records including item identifiers and item attribute fields, dividing item records associated with a plurality of user profiles to generate a shallow representation and a deep representation, wherein the deep representation is based on a more granular definition of the item records than the shallow representation;

generating a shallow holding matrix identifying the item records associated with the user profiles based on a shallow representation of the item records;

generating a deep holding matrix based on the more granular definition of the item records than the shallow representation in the shallow holding matrix;

generating a similarity score matrix of scores between the deep representations based on a similarity between respective attribute values of the item attribute fields of the items;

decomposing, by way of matrix factorization, the shallow holding matrix into a lower-dimensionality user latent representation and a lower-dimensionality product feature latent representation, based at least in part on the similarity score matrix;

concatenating the product feature latent representation and product information to be passed to a first neural network to generate a first output;

concatenating the user latent representation and user information to be passed to a second neural network to generate a second output;

performing a dot product matrix multiplication on the first output and the second output to generate, for every user profile and each product from a predefined number of products, a probability for a recommendation; and storing the probability for a recommendation for every user profile and each product from the predefined number of products in a data structure, wherein the predefined number of products in the data structure are chosen using a random negative sampling technique; and generating an output to communicate at least one product not associated with a particular user profile based on the dot product matrix multiplication.

2. The method of claim 1 comprising: dividing at least one of the item records defined by the shallow representation into one or more deep representations of the at least one item record.

3. The method of claim 1 wherein a first deep representation corresponding to a first shallow representation of a first item record and a second deep representation corresponding to a second shallow representation of a second item record have a similarity score of zero.

4. A computer system comprising:

a processor;

a memory in communication with the processor, the memory storing instructions that, when executed by the processor cause the processor to:

from a data store of items including a plurality of item records including item identifiers and item attribute fields, divide item records associated with a plurality of user profiles to generate a shallow representation and a deep representation, wherein the deep representation is based on a more granular definition of the item records than the shallow representation;

generate a shallow holding matrix identifying the item records associated with the user profiles based on the shallow representation of the item records;

generate a deep holding matrix based on the more granular definition of the item records than the shallow representation in the shallow holding matrix;

generate a similarity score matrix of scores between the deep representations based on a similarity between respective attribute values of the item attribute fields;

decompose, by way of matrix factorization, the shallow holding matrix into a lower-dimensionality user latent representation and a lower-dimensionality product feature latent representation, based at least in part on the similarity score matrix;

concatenate the product feature latent representation and product information to be passed to a first neural network to generate a first output;

concatenate the user latent representation and user information to be passed to a second neural network to generate a second output;

perform a dot product matrix multiplication on the first output and the second output to generate, for every user profile and each product from a predefined number of products, a probability for a recommendation; and store the probability for a recommendation for every user profile and each product from the predefined number of products in a data structure, wherein the predefined number of products in the data structure are chosen using a random negative sampling technique; and generate an output to communicate at least one product not associated with a particular user profile based on the dot product matrix multiplication.

5. The system of claim 4 wherein when executed, the instructions cause the processor to divide at least one of the item records defined by the shallow representation into one or more deep representations of the at least one item record.

6. The system of claim 4 wherein a first deep representation corresponding to a first shallow representation of a first item record and a second deep representation corresponding to a second shallow representation of a second item record have a similarity score of zero.

7. A non-transitory computer-readable medium having computer executable instructions stored thereon for execution by one or more computing devices, that when executed perform:

from a data store of items including a plurality of item records including item identifiers and item attribute fields, dividing item records associated with a plurality of user profiles to generate a shallow representation and a deep representation, wherein the deep representation is based on a more granular definition of the item records than the shallow representation;

generating a shallow holding matrix identifying the item records associated with the user profiles based on the shallow representation of the item records;

generating a deep holding matrix based on the more granular definition of the item records than the shallow representation in the shallow holding matrix;

generating a similarity score matrix of scores between the deep representations based on a similarity between respective attribute values of the item attribute fields;

decomposing, by way of matrix factorization, the shallow holding matrix into a lower-dimensionality user latent representation and a lower-dimensionality product feature latent representation, based at least in part on the similarity score matrix;

concatenating the product feature latent representation and product information to be passed to a first neural network to generate a first output;

concatenating the user latent representation and user information to be passed to a second neural network to generate a second output;

performing a dot product matrix multiplication on the first output and the second output to generate, for every user profile and each product from a predefined number of products, a probability for a recommendation; and storing the probability for a recommendation for every user profile and each product from the predefined number of products in a data structure, wherein the predefined number of products in the data structure are chosen using a random negative sampling technique; and generating an output to communicate at least one product not associated with a particular user profile based on the dot product matrix multiplication.

8. The non-transitory computer-readable medium of claim 7 wherein when executed, the instructions cause the one or more computing devices to divide at least one of the item records defined by the shallow representation into one or more deep representations of the at least one item record.

9. The non-transitory computer-readable medium of claim 7 wherein a first deep representation corresponding to a first shallow representation of a first item record and a second deep representation corresponding to a second shallow representation of a second item record have a similarity score of zero.

* * * * *